(12) United States Patent
Sherba

(10) Patent No.: US 12,085,311 B2
(45) Date of Patent: Sep. 10, 2024

(54) SOLAR TOWER

(71) Applicant: 1115746 BC LTD., Kelowna (CA)

(72) Inventor: Peter Sherba, Kelowna (CA)

( * ) Notice: Subject to any disclaimer, the term of this patent is extended or adjusted under 35 U.S.C. 154(b) by 170 days.

(21) Appl. No.: 17/626,452

(22) PCT Filed: Sep. 23, 2019

(86) PCT No.: PCT/CA2019/051358
§ 371 (c)(1),
(2) Date: Jan. 11, 2022

(87) PCT Pub. No.: WO2021/056092
PCT Pub. Date: Apr. 1, 2021

(65) Prior Publication Data
US 2022/0243958 A1    Aug. 4, 2022

(51) Int. Cl.
| | |
|---|---|
| *F24S 20/60* | (2018.01) |
| *F24S 23/77* | (2018.01) |
| *F24S 25/10* | (2018.01) |
| *H02S 20/10* | (2014.01) |
| *H02S 40/22* | (2014.01) |
| *H02S 40/42* | (2014.01) |
| *F24S 20/00* | (2018.01) |

(52) U.S. Cl.
CPC ............... *F24S 20/60* (2018.05); *F24S 23/77* (2018.05); *F24S 25/10* (2018.05); *H02S 20/10* (2014.12); *H02S 40/22* (2014.12); *H02S 40/425* (2014.12); *F24S 2020/18* (2018.05)

(58) Field of Classification Search
None
See application file for complete search history.

(56) References Cited

U.S. PATENT DOCUMENTS

| | | | | |
|---|---|---|---|---|
| 4,297,521 A | * | 10/1981 | Johnson | F24S 23/00 |
| | | | | 126/684 |
| 4,776,429 A | * | 10/1988 | Osborn | B65G 69/22 |
| | | | | 182/147 |
| 4,812,080 A | * | 3/1989 | Urquhart | E02B 17/027 |
| | | | | 405/227 |
| 6,028,566 A | * | 2/2000 | Pennell | H01Q 1/246 |
| | | | | 248/219.3 |
| 9,422,922 B2 | | 8/2016 | Anselmo et al. | |

(Continued)

FOREIGN PATENT DOCUMENTS

| | | |
|---|---|---|
| CN | 106049958 | 10/2016 |
| CN | 106049958 A * | 10/2016 |

(Continued)

*Primary Examiner* — Joshua K Ihezie

(57) ABSTRACT

A system and method for collecting solar energy wherein the system comprising a tower formed having a plurality of stories, the tower formed of a plurality of structural members extending between hub connectors to form a space frame providing a vertical airflow path therethrough and a plurality of solar panels secured to an outside periphery of the tower. The method comprises providing a tower formed having a plurality of stories, the tower formed of a plurality of structural members extending between hub connectors to form a space frame providing a vertical airflow path therethrough and securing a plurality of solar panels to and around an outside periphery of the tower.

9 Claims, 5 Drawing Sheets

(56) References Cited

U.S. PATENT DOCUMENTS

| | | | |
|---|---|---|---|
| 2008/0017448 A1* | 1/2008 | Hayes | E04G 27/00 |
| | | | 182/178.1 |
| 2011/0214364 A1 | 9/2011 | Fuller | |
| 2020/0343852 A1* | 10/2020 | Chentnik | F21S 8/085 |
| 2023/0272972 A1* | 8/2023 | Davidowitz | F24S 20/20 |
| | | | 34/522 |

FOREIGN PATENT DOCUMENTS

| | | | |
|---|---|---|---|
| CN | 206448597 | | 8/2017 |
| CN | 206448597 U | * | 8/2017 |
| CN | 107542312 | | 1/2018 |
| CN | 107542312 A | * | 1/2018 |
| DE | 202005004917 | | 8/2005 |
| JP | 2012137039 | | 7/2012 |
| WO | 2019169498 | | 9/2019 |

\* cited by examiner

SOLAR TOWER

BACKGROUND OF THE INVENTION

1. Field of Invention

The present invention relates generally to energy collection and in particular to a tower for collecting solar energy.

2. Description of Related Art

Solar power is a common form of collecting energy for industrial commercial and residential use. One difficulty with collecting solar energy is the inefficiencies of conventional solar panels. This inefficiency therefore requires larger surface areas of solar panels to collect sufficient energy. One solution to this problem is to provide a large area of land to locate solar panels on. It will be appreciated however that such solutions may not be practical in all locations such as, by way of non-limiting example, within city limits or high population neighborhoods.

One attempted solution to increasing solar collection with smaller footprints has been to locate solar panels on towers or buildings. Disadvantageously, when located on towers or the like, such solar panels may be expensive and time consuming to construct and may also be prone to effects of wind or the like.

SUMMARY OF THE INVENTION

According to a first embodiment of the present invention there is disclosed a system for collecting solar energy comprising a tower having a plurality of stories, the tower formed of a plurality of structural members extending between hub connectors to form a space frame providing a vertical airflow path therethrough and a plurality of solar panels secured to an outside periphery of the tower.

The tower may have a trapezoidal cross section having a long front wall, a short rear wall and angled sidewalls. The plurality of solar panels may be secured to the long front wall and the angled sidewalls. The plurality of solar panels may be secured in a vertical orientation to the tower. The plurality of solar panels may be arranged in rows around the tower.

Each of the plurality of solar panels may include reflector panels posited therebelow. The reflector panels may be angled outwardly from the tower. The reflector panels may form a vent gap between a bottom edge thereof and the tower. The tower may include grated decking between levels therein.

According to a further embodiment of the present invention there is disclosed a method for collecting solar energy comprising providing a tower formed having a plurality of stories, the tower formed of a plurality of structural members extending between hub connectors to form a space frame providing a vertical airflow path therethrough and securing a plurality of solar panels to and around an outside periphery of the tower.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
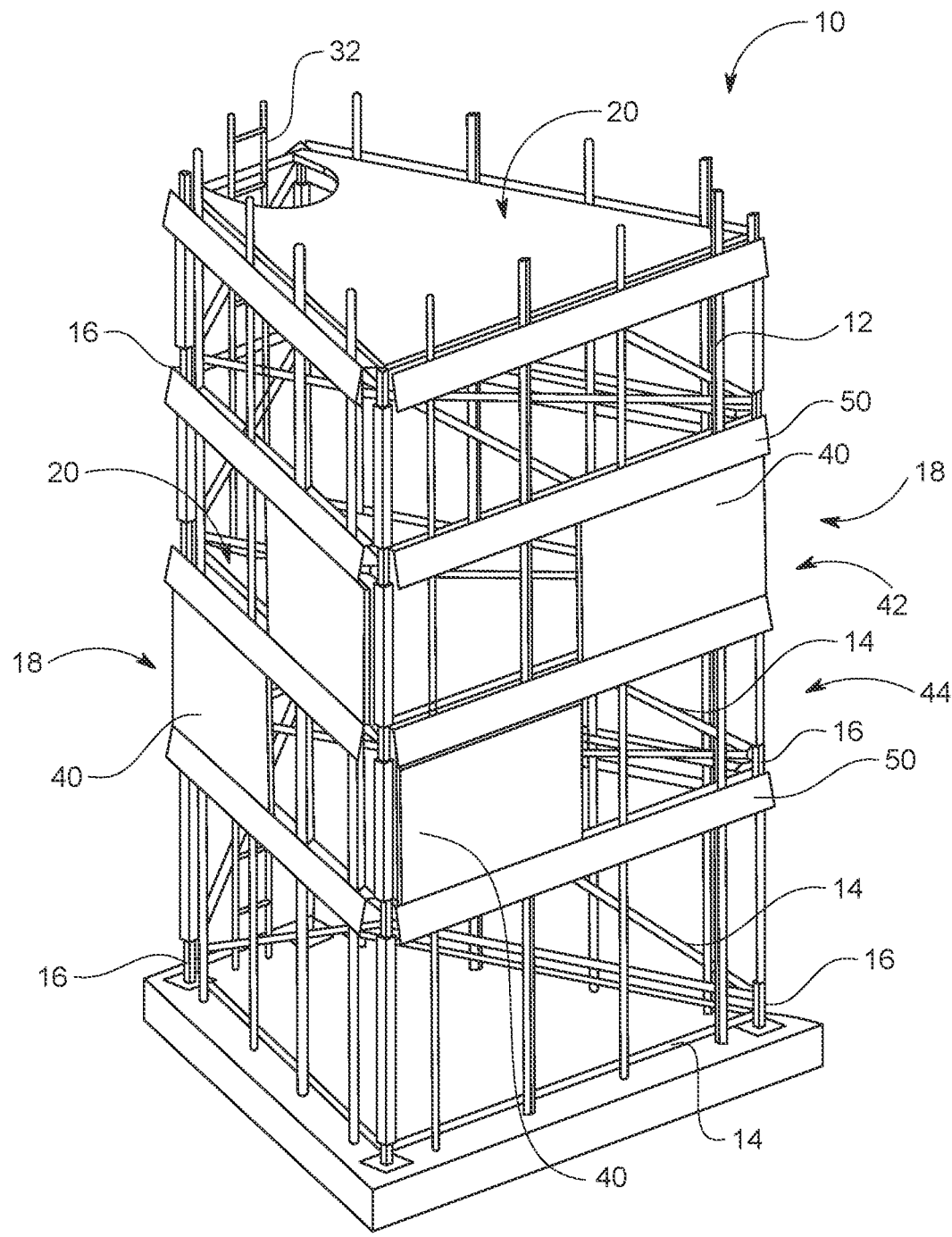
FIG. 1 is a perspective view of a tower for collecting solar energy according to a first embodiment of the present invention.
Figure 2:
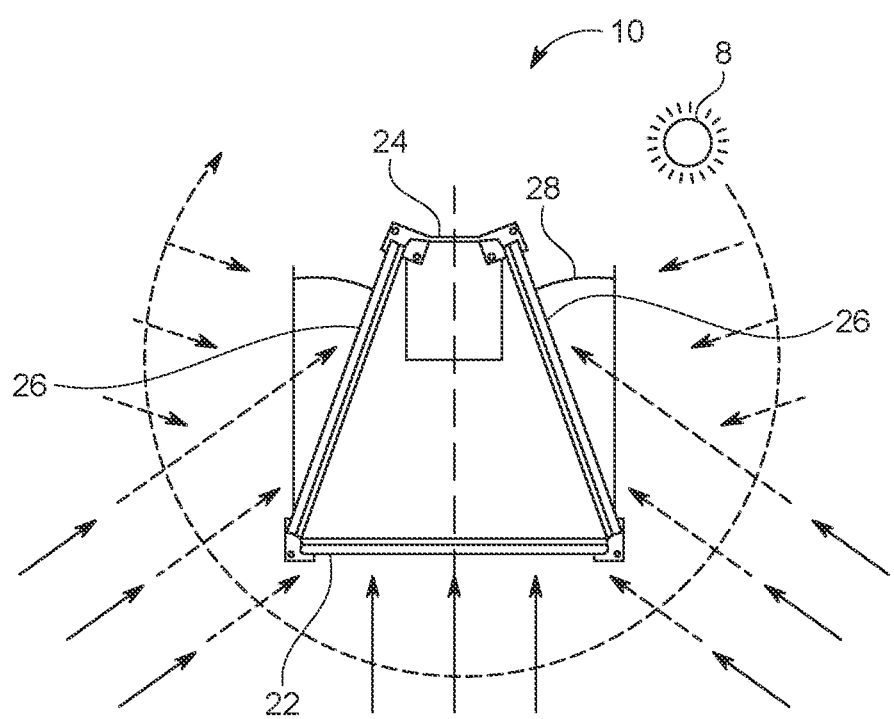
FIG. 2 is a top plan view of the tower of FIG. 1.
Figure 3:
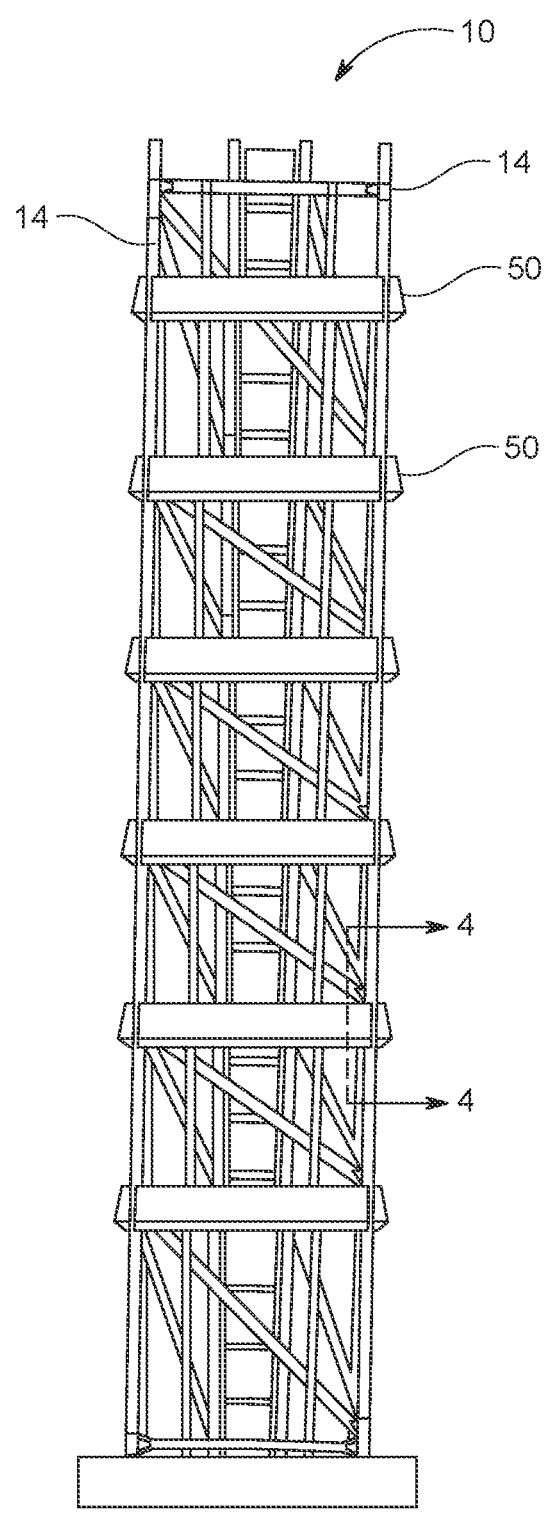
FIG. 3 is a side view of the tower of FIG. 2.

Referring to FIG. 1, a tower for collecting energy according to a first embodiment of the invention is shown generally at 10. The tower comprises a space frame 12 having a plurality of solar panels 40 supported around a periphery thereof. The space frame 12 is formed of a plurality of structural members 14 connected to each other by a plurality of hub members 16. It will be appreciated that any such space frame system may be utilized such as, by way of non-limiting example, U.S. Pat. No. 3,276,361 filed Feb. 10, 1064 the entirety of which is hereby incorporated by reference.

As illustrated the space frame 12 may be arranged into levels 18 with floors 20 therebetween. The floor 20 may be formed of grating or any other suitable air permeable material so as to permit airflow in a vertical direct through the tower 10. A ladder 32 or other means for providing access to each floor 20 of the tower 10 may also be provided as is commonly known.

As illustrated in Figure tower 10 has a trapezoidal cross section formed of a wide front wall 22, a narrow rear wall 24 and angled side walls 26 therebetween. The plurality of solar panels 40 are arranged on each of the front wall 22 and side walls 26 such that as the sun 8 moves through its daily path, each of the front and side walls 22 and 26 will have the solar panels 40 located thereon exposed to sunlight so as to maximize the duration of collection. The side panels may be angular offset from perpendicular to the front and rear walls 22 and 24 by an angle of between 18 and 22 degrees. It will also be appreciated that the orientation of the tower 10 should be selected so as to optimize solar collection such as, by way of non-limiting example, orienting the front wall 22 south. In practice it has been found that providing a front wall 22 and side walls 26 which are substantially the same length has been found useful to equalize solar collection however, the front wall may also be sized up to 25% wider than the side walls as well to increase collection at the brightest times of the day.

Figure 4:
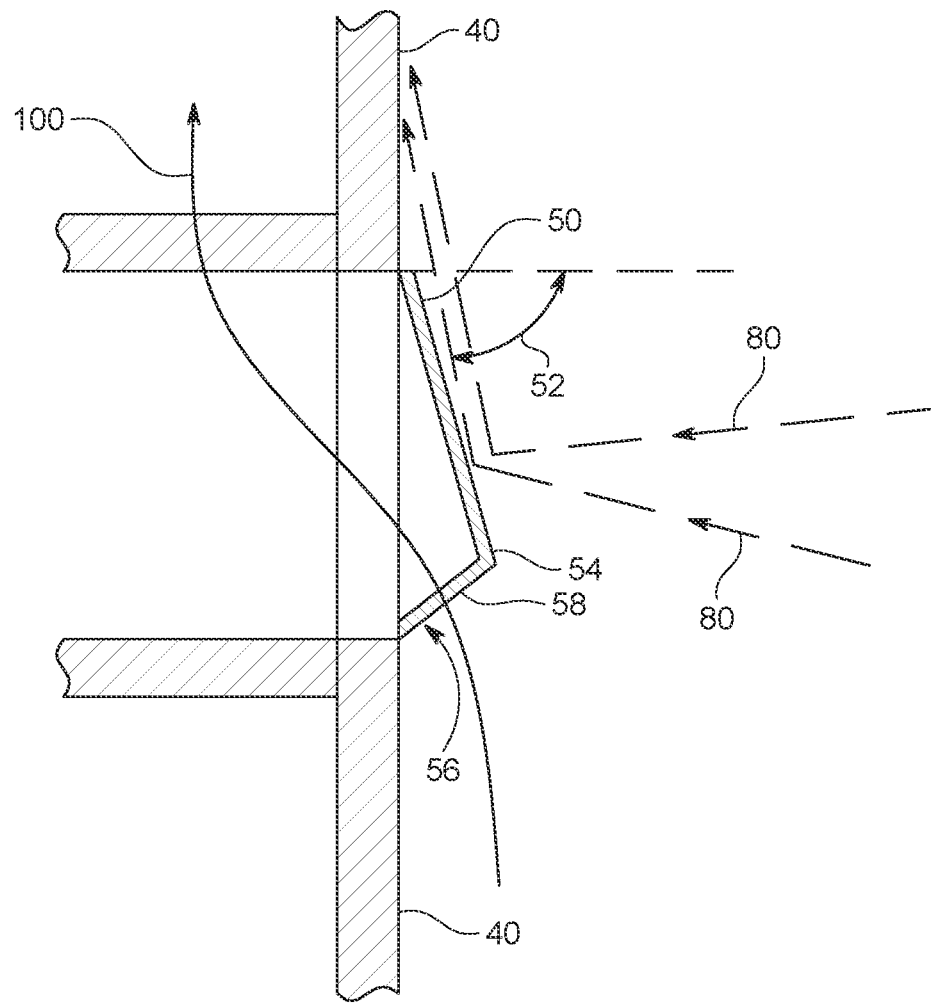
FIG. 4 is a partial cross sectional view of the tower of FIG. 1 as taken along the line 4-4.
Figure 5:
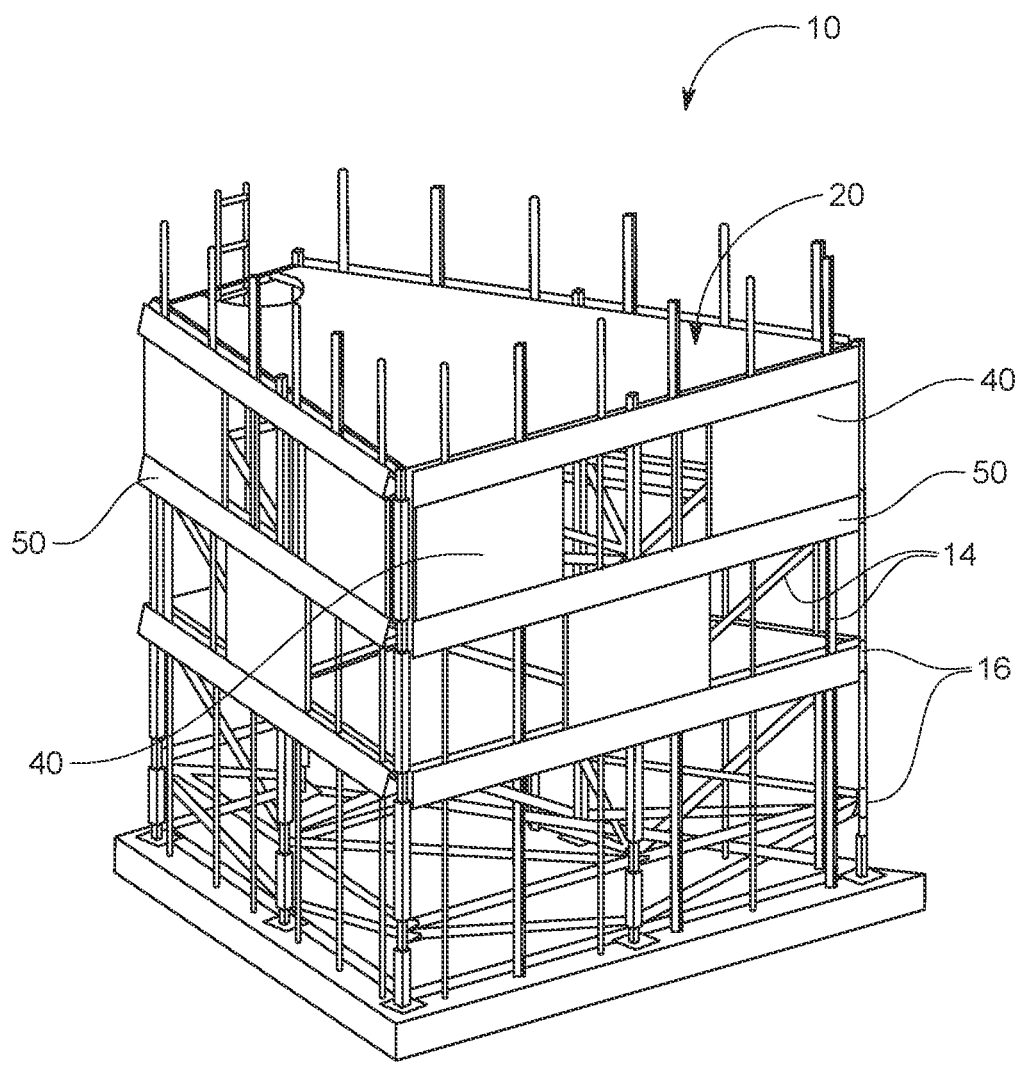
FIG. 5 is a perspective view of a tower for collecting solar energy according to a further embodiment of the present invention.

The solar panels 40 are arranged around the tower 10 in horizontal rows. As illustrated in FIG. 1, the tower may include two rows 42 and 44 for each level although different numbers of rows may also be utilized. Although each row 42 and 44 in FIG. 1 is illustrated with a single solar panel 40, it will be appreciated that more than one solar panel may be utilized. Each row 42 or 44 of solar panels includes a reflector panel 50 located therebelow. As illustrated in FIG. 4, the reflector panel is angled relative to horizontal by a reflector angle 52 selected to be between 72 and 84 degrees. The reflector panels 50 may be mirrored or formed of any other reflective material. The reflector panels 50 are secured to the tower 10 or solar panel 40 below the solar panel 40 with a bottom edge 64 of the reflector panels spaced apart from the tower 10 to form a vent gap 56. The vent gap 66 may be open or may contain a screen 58 or the like so as to permit airflow therethrough. In operation, the reflector panels reflect sunlight 80 onto the solar panel above it so as to increase light collection. Furthermore, the vent gaps 66 permit airflow therethrough which in combination with the grating on the floors 20 permits a generally upward airflow 100 through the tower. This airflow will be useful in cooling the solar panels thereby increasing efficiency.

While specific embodiments of the invention have been described and illustrated, such embodiments should be considered illustrative of the invention only and not as limiting the invention as construed in accordance with the accompanying claims.

What is claimed is:

1. A system for collecting solar energy comprising:
    a tower formed having a plurality of stories, said tower formed of a plurality of structural members extending between hub connectors to form a space frame providing a vertical airflow path therethrough; and
    a plurality of solar panels secured to an outside periphery of said tower,
    wherein each of said plurality of solar panels includes reflector panels positioned therebelow.

2. The system of claim 1 wherein said tower has a trapezoidal cross section having a long front wall, a short rear wall and angled sidewalls.

3. The system of claim 2 wherein said plurality of solar panels are secured to said long front wall and said angled sidewalls.

4. The system of claim 3 wherein said plurality of solar panels are secured in a vertical orientation to said tower.

5. The system of claim 4 wherein said plurality of solar panels are arranged in rows around said tower.

6. The system of claim 1 wherein said reflector panels are angled outwardly from said tower.

7. The system of claim 1 wherein said reflector panels form a vent gap between a bottom edge thereof and said tower.

8. The system of claim 1 wherein said tower includes grated decking between levels therein.

9. A method for collecting solar energy comprising:
    providing a tower formed having a plurality of stories, said tower formed of a plurality of structural members extending between hub connectors to form a space frame providing a vertical airflow path therethrough; and
    securing a plurality of solar panels to and around an outside periphery of said tower,
    wherein each of said plurality of solar panels includes reflector panels positioned therebelow.

* * * * *